(12) United States Patent
Gan

(10) Patent No.: US 10,963,143 B2
(45) Date of Patent: Mar. 30, 2021

(54) DATA EDITING METHOD AND APPARATUS

(71) Applicant: HUAWEI TECHNOLOGIES CO., LTD., Shenzhen (CN)

(72) Inventor: Yuanli Gan, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/758,729

(22) PCT Filed: Sep. 9, 2015

(86) PCT No.: PCT/CN2015/089283
§ 371 (c)(1),
(2) Date: Mar. 9, 2018

(87) PCT Pub. No.: WO2017/041254
PCT Pub. Date: Mar. 16, 2017

(65) Prior Publication Data
US 2018/0275857 A1 Sep. 27, 2018

(51) Int. Cl.
*G06F 3/0484* (2013.01)
*H04W 88/02* (2009.01)
(Continued)

(52) U.S. Cl.
CPC ...... *G06F 3/04845* (2013.01); *G06F 3/04883* (2013.01); *G06F 40/166* (2020.01); *H04W 88/02* (2013.01); *G06F 3/04842* (2013.01)

(58) Field of Classification Search
CPC . G06F 3/04845; G06F 3/04883; H04W 88/02
See application file for complete search history.

(56) References Cited

U.S. PATENT DOCUMENTS 5,471,578 A * 11/1995 Moran ................ G06F 3/04842
715/764
5,999,169 A * 12/1999 Lee ..................... G06F 3/03543
345/163
(Continued)

FOREIGN PATENT DOCUMENTS

CN 101925894 A 12/2010
CN 103049206 A 4/2013
(Continued)

OTHER PUBLICATIONS

XP055492759 Paul Terson, "Using Windows Magnifier and Its Alternatives for Easier Reading on th Screen", Maketecheasier, Mar. 18, 2015, total 10 pages.
(Continued)

*Primary Examiner* — Seth A Silverman
(74) *Attorney, Agent, or Firm* — Kilpatrick Townsend & Stockton LLP

(57) ABSTRACT

Embodiments of the present invention disclose a data editing method and apparatus. In the present invention, the method includes: obtaining first gesture information entered by a user; creating an enlarged area according to an indication position on a screen of a terminal by the first gesture information; obtaining second gesture information entered by the user, where the second gesture information is used to adjust the enlarged area to be in a stationary state or a movable state; adjusting the enlarged area in the stationary state or the movable state, activating, by using third gesture information, data displayed in an enlarged manner within the adjusted enlarged area to an editable state, and editing the data displayed in an enlarged manner within the adjusted enlarged area. The present invention can improve operation flexibility of data editing.

15 Claims, 11 Drawing Sheets

(51) Int. Cl.
*G06F 40/166* (2020.01)
*G06F 3/0488* (2013.01)

(56) References Cited

U.S. PATENT DOCUMENTS

| | | | |
|---|---|---|---|
| 2009/0189862 A1 | 7/2009 | Viberg | |
| 2012/0306778 A1* | 12/2012 | Weeldreyer | G06F 3/0488 345/173 |
| 2012/0306779 A1 | 12/2012 | Weeldreyer et al. | |
| 2013/0215018 A1* | 8/2013 | Xu | G06F 3/0488 345/157 |
| 2014/0013216 A1 | 1/2014 | Sakuta | |
| 2015/0169130 A1 | 6/2015 | Gao et al. | |
| 2015/0248233 A1 | 9/2015 | Murrett et al. | |
| 2016/0048304 A1* | 2/2016 | Niranjani | G06F 3/0488 715/800 |
| 2016/0162162 A1 | 6/2016 | Liu | |

FOREIGN PATENT DOCUMENTS

| | | |
|---|---|---|
| CN | 103164163 A | 6/2013 |
| CN | 103562841 A | 2/2014 |
| CN | 103620531 A | 3/2014 |
| CN | 103677594 A | 3/2014 |
| CN | 103718149 A | 4/2014 |
| CN | 103777866 A | 5/2014 |
| CN | 103777877 A | 5/2014 |
| CN | 103902218 A | 7/2014 |
| CN | 104111787 A | 10/2014 |
| WO | 2013077014 A1 | 5/2013 |

OTHER PUBLICATIONS

XP055492782 Mark Guim, "How to use the Magnifier in Windows 10", dated Aug. 19, 2015, total 11 pages.

* cited by examiner

DATA EDITING METHOD AND APPARATUS

CROSS-REFERENCE TO RELATED APPLICATIONS

This application is a National Stage of International Application No. PCT/CN2015/089283, filed Sep. 9, 2015, which is hereby incorporated by reference in its entirety.

TECHNICAL FIELD

The present invention relates to the field of communications technologies, and in particular, to a data editing method and apparatus.

BACKGROUND

With development of communications technologies, a terminal has more powerful application functions and has become an indispensable tool in daily life of people, and mobile offices are more widely applied in daily life of people. For example, a user may communicate with a contact by using an instant messaging tool on the terminal, or receive and send an email, process a document, read a book, or browse a web page by using the terminal.

Due to a limited size of a screen of the terminal, a data editing function of the mobile working cannot be conveniently used on the terminal. For example, because a smartphone or a tablet computer has a relatively small touch display screen, content of data information displayed on a display screen is also small-sized. As a result, if a user uses a finger as a cursor to perform an operation, the user cannot easily and accurately adjust a position of the finger when editing data.

Currently, when the terminal performs the data editing function, handles are usually set at positions to be edited. A piece of data is selected by using upper and lower handles. Then, the positions of the handles are changed, and are fine-tuned. However, the data is easily blocked by the upper and lower handles, and it is quite difficult to control the handles. Consequently, it is still relatively inconvenient to edit data.

SUMMARY

Embodiments of the present invention provide a data editing method and apparatus, so as to improve operation flexibility of data editing.

According to a first aspect, a data editing method is provided, including:

obtaining first gesture information entered by a user, where the first gesture information is used to create an enlarged area;

creating the enlarged area according to an indication position on a screen of a terminal by the first gesture information;

obtaining second gesture information entered by the user, where the second gesture information is used to adjust the enlarged area to be in a stationary state or a movable state, where data within the enlarged area in the stationary state or the movable state is in a non-editable state;

obtaining an operation performed by the user on the enlarged area in the stationary state or the movable state, and adjusting the enlarged area in the stationary state or the movable state, where if the enlarged area is in the stationary state, the enlarged area is adjusted to a fixed position on the screen of the terminal, or if the enlarged area is in the movable state, a position of the enlarged area in the movable state is adjusted according to the operation performed by the user on the enlarged area in the movable state; and obtaining third gesture information entered by the user, activating, according to the third gesture information, data displayed in an enlarged manner within the adjusted enlarged area to an editable state, and editing the data displayed in an enlarged manner within the adjusted enlarged area.

With reference to the first aspect, in a first implementation manner, the creating the enlarged area according to an indication position on a screen of a terminal by the first gesture information includes:

selecting, in a row direction in which data is displayed and by using the indication position on the screen of the terminal by the first gesture information as a center, M characters as characters to be enlarged, where M is a positive integer; and creating, by invoking an enlargement tool control, an enlarged area in which the M characters can be displayed.

With reference to the first aspect or the first implementation manner of the first aspect, in a second implementation manner, the adjusting a position of the enlarged area in the movable state according to the operation performed by the user on the enlarged area in the movable state includes:

if the operation performed by the user on the enlarged area in the movable state is moving a cursor within the enlarged area in the movable state, detecting a position of the moved cursor within the enlarged area in the movable state; and if the cursor is moved to a leftmost edge of the enlarged area in the movable state, moving the enlarged area in the movable state to the left by N characters by using the cursor as a start position, where N is a positive integer; or if the cursor is moved to a rightmost edge of the enlarged area in the movable state, moving the enlarged area in the movable state to the right by N characters by using the cursor as a start position, where N is a positive integer.

With reference to the first aspect or the first implementation manner of the first aspect, in a third implementation manner, the adjusting a position of the enlarged area in the movable state according to the operation performed by the user on the enlarged area in the movable state includes:

if the operation performed by the user on the enlarged area in the movable state is moving the enlarged area, determining a moving direction; and moving the enlarged area in the movable state step by step in the moving direction according to a stepping unit, where the stepping unit is a minimum unit determined according to the moving direction for moving the enlarged area.

With reference to the third implementation manner of the first aspect, in a fourth implementation manner, the moving the enlarged area in the movable state step by step in the moving direction according to a stepping unit includes:

if the moving direction is the row direction in which data is displayed, moving, by using a center of the enlarged area in the movable state as an origin and by using at least one character string as the stepping unit, the enlarged area step by step in the row direction in which data is displayed;

if the moving direction is a column direction in which data is displayed, moving, by using a center of the enlarged area as an origin and by using at least one integer row as the stepping unit, the enlarged area step by step in the column direction in which data is displayed; or if the moving direction is an angular direction which forms a specified angle with the row direction in which data is displayed, by using a center of the enlarged area as an origin, moving, by using at least one integer row as the stepping unit, the enlarged area step by step in a column direction in which data is displayed and that corresponds to the angular direction, and moving, by using one character string as the stepping unit, the enlarged area in a row direction in which data is displayed and that corresponds to the angular direction.

With reference to any one of the first aspect or the foregoing implementation manners of the first aspect, in a fifth implementation manner, the first gesture information, the second gesture information and the third gesture information each include finger joint information, pressing information, or double-tap information.

With reference to any one of the first aspect or the foregoing implementation manners of the first aspect, in a sixth implementation manner, the method further includes:

obtaining fourth gesture information entered by the user; and removing the enlarged area according to the fourth gesture information.

According to a second aspect, a data editing apparatus is provided, including: an obtaining unit, a processing unit, and an editing unit, where the obtaining unit is configured to obtain first gesture information, second gesture information, and third gesture information entered by a user, and is configured to obtain an operation performed by the user on an enlarged area in a stationary state or the movable state, where the first gesture information is used to create the enlarged area, the second gesture information is used to adjust the enlarged area to be in the stationary state or the movable state, and the third gesture information is used to activate data displayed in an enlarged manner within the adjusted enlarged area to an editable state;

the processing unit is configured to create the enlarged area according to an indication position on a screen of a terminal by the first gesture information obtained by the obtaining unit;

the processing unit is further configured to adjust, according to the second gesture information obtained by the obtaining unit, the enlarged area to be in the stationary state or the movable state, where data within the enlarged area in the stationary state or the movable state is in a non-editable state, and is configured to:

adjust the enlarged area in the stationary state or the movable state according to the operation that is performed by the user on the enlarged area in the stationary state or the movable state and that is obtained by the obtaining unit, where if the enlarged area is in the stationary state, the enlarged area is adjusted to a fixed position on the screen of the terminal, or if the enlarged area is in the movable state, a position of the enlarged area in the movable state is adjusted according to the operation performed by the user on the enlarged area in the movable state; and the editing unit is configured to activate the data displayed in an enlarged manner within the adjusted enlarged area to the editable state according to the third gesture information entered by the user and obtained by the obtaining unit, and edit the data displayed in an enlarged manner within the adjusted enlarged area.

With reference to the second aspect, in a first implementation manner, the processing unit is specifically configured to create, in the following manner, the enlarged area according to the indication position on the screen of the terminal by the first gesture information: selecting, in a row direction in which data is displayed and by using the indication position on the screen of the terminal by the first gesture information as a center, M characters as characters to be enlarged, where M is a positive integer; and creating, by invoking an enlargement tool control, an enlarged area in which the M characters can be displayed.

With reference to the second aspect or the first implementation manner of the second aspect, in a second implementation manner, the processing unit is specifically configured to adjust, in the following manner, a position of the enlarged area in the movable state according to the operation performed by the user on the enlarged area in the movable state:

if the operation performed by the user on the enlarged area in the movable state is moving a cursor within the enlarged area in the movable state, detecting a position of the moved cursor within the enlarged area in the movable state; and if the cursor is moved to a leftmost edge of the enlarged area in the movable state, moving the enlarged area in the movable state to the left by N characters by using the cursor as a start position, where N is a positive integer; or if the cursor is moved to a rightmost edge of the enlarged area in the movable state, moving the enlarged area in the movable state to the right by N characters by using the cursor as a start position, where N is a positive integer.

With reference to the second aspect or the first implementation manner of the second aspect, in a third implementation manner, the processing unit is specifically configured to adjust, in the following manner, a position of the enlarged area in the movable state according to the operation performed by the user on the enlarged area in the movable state:

if the operation performed by the user on the enlarged area in the movable state is moving the enlarged area, determining a moving direction; and moving the enlarged area in the movable state step by step in the moving direction according to a stepping unit, where the stepping unit is a minimum unit determined according to the moving direction for moving the enlarged area.

With reference to the third implementation manner of the second aspect, in a fourth implementation manner, the processing unit is specifically configured to move, in the following manner, the enlarged area in the movable state step by step in the moving direction according to the stepping unit:

if the moving direction is the row direction in which data is displayed, moving, by using a center of the enlarged area in the movable state as an origin and by using at least one character string as the stepping unit, the enlarged area step by step in the row direction in which data is displayed;

if the moving direction is a column direction in which data is displayed, moving, by using a center of the enlarged area as an origin and by using at least one integer row as the stepping unit, the enlarged area step by step in the column direction in which data is displayed; or if the moving direction is an angular direction which forms a specified angle with the row direction in which data is displayed, by using a center of the enlarged area as an origin, moving, by using at least one integer row as the stepping unit, the enlarged area step by step in a column direction in which data is displayed and that corresponds to the angular direction, and moving, by using one character string as the stepping unit, the enlarged area in a row direction in which data is displayed and that corresponds to the angular direction.

With reference to any one of the second aspect or the foregoing implementation manners of the second aspect, in a fifth implementation manner, the first gesture information, the second gesture information and the third gesture information each include finger joint information, pressing information, or double-tap information.

With reference to any one of the second aspect or the foregoing implementation manners of the second aspect, in a sixth implementation manner, the obtaining unit is further configured to obtain fourth gesture information entered by the user; and the processing unit is further configured to remove the enlarged area according to the fourth gesture information obtained by the obtaining unit.

With reference to any one of the second aspect or the foregoing implementation manners of the second aspect, in a seventh implementation manner, the data editing apparatus is a terminal.

According to the data editing method and apparatus that are provided in the embodiments of the present invention, an enlarged area is pre-created according to an indication position indicated by first gesture information entered by a user. Then, the created enlarged area is adjusted, according to second gesture information entered by the user, to be in a stationary state or a movable state, and is further adjusted. Then, data displayed in an enlarged manner is edited within the adjusted enlarged area. In this way, the user can conveniently and accurately adjust a position of a cursor when performing editing, and the user can adjust a position of the enlarged area, improving operation flexibility of a data editing function.

DESCRIPTION OF EMBODIMENTS

The following clearly describes the technical solutions in the embodiments of the present invention with reference to the accompanying drawings in the embodiments of the present invention.

According to a data editing method provided in the embodiments of the present invention, an enlarged area is pre-created according to an indication position indicated by first gesture information entered by a user. Then, the created enlarged area is adjusted according to second gesture information entered by the user, so that the enlarged area is adjusted to a position convenient for the user to perform an operation. Then, data displayed in an enlarged manner is edited within the adjusted enlarged area. In this way, the user can conveniently and accurately adjust a position of a cursor when performing editing, and the user can adjust a position of the enlarged area, further improving operation flexibility of a data editing function.

It should be noted that in the specification, claims, and accompanying drawings of the embodiments of the present invention, the terms "first", "second", and so on are intended to distinguish between similar objects but do not necessarily indicate a specific order or sequence. It should be understood that terms termed in such a way are interchangeable in proper circumstances so that the embodiments of the present invention described herein can be implemented in other orders than the order illustrated or described herein.

Figure 1:
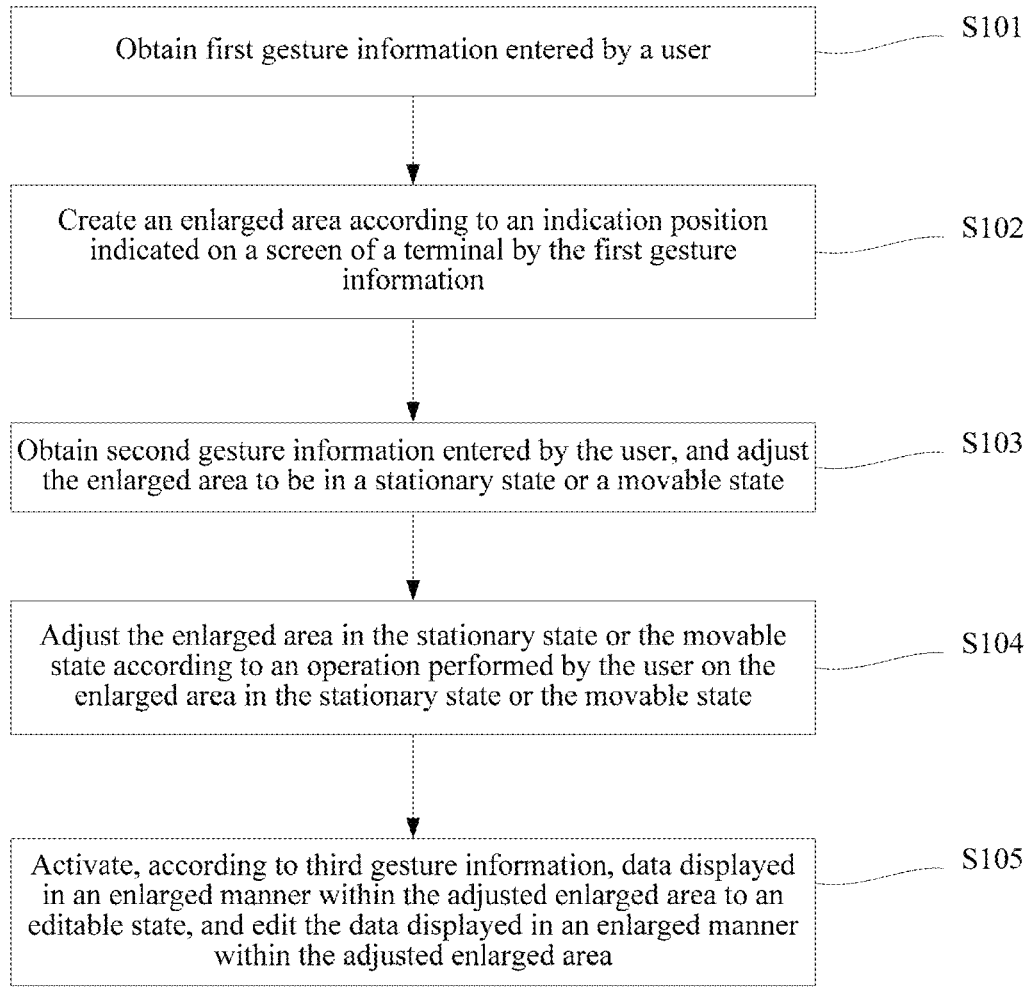
FIG. 1 is a flowchart of implementing a data editing method according to an embodiment of the present invention.

FIG. 1 is a flowchart of implementing a data editing method according to an embodiment of the present invention. The method shown in FIG. 1 is executed by a terminal. It should be understood that the terminal involved in this embodiment of the present invention may also be referred to as a mobile terminal, a mobile station (MS), user equipment (UE), and the like. The terminal may communicate with one or more core networks by using a radio access network (RAN). For example, the terminal may be a mobile phone (or referred to as a cellular phone) or a computer with a mobile terminal. For example, the terminal may be a portable, pocket-sized, handheld, computer-built in, or in-vehicle mobile apparatus, which exchanges voice and/or data with the radio access network.

As shown in FIG. 1, the data editing method according to this embodiment of the present invention includes the following steps.

S101: Obtain first gesture information entered by a user.

In this embodiment of the present invention, the first gesture information entered by the user may be finger joint information, pressing information, double-tap information, or the like. The first gesture information is used to create an enlarged area.

S102: Create an enlarged area according to an indication position on a screen of a terminal by the first gesture information.

In this embodiment of the present invention, the user may perform an operation on the screen of the terminal according to the first gesture information such as finger joint information, pressing information, or double-tap information. The terminal identifies the indication position on the screen of the terminal by the first gesture information, and creates the enlarged area according to the identified indication position.

Figure 2:
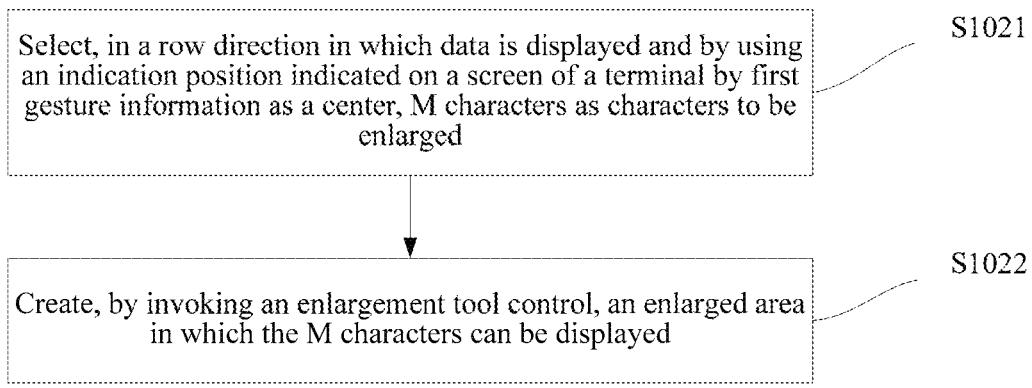
FIG. 2 is a flowchart of creating an enlarged area according to an embodiment of the present invention.

Optionally, in this embodiment of the present invention, the terminal may create, by using a method procedure shown in FIG. 2, the enlarged area according to the indication position on the screen of the terminal by the first gesture information. The method procedure includes:

S1021: Select, in a row direction in which data is displayed and by using the indication position on the screen of the terminal by the first gesture information as a center, M characters as characters to be enlarged, where M is a positive integer.

S1022: Create, by invoking an enlargement tool control, an enlarged area in which the M characters can be displayed.

In this embodiment of the present invention, the enlargement tool control is a tool control that the terminal originally has. An existing method may be used to display the M characters in an enlarged manner by using the enlargement tool control. This is not limited in this embodiment of the present invention.

S103: Obtain second gesture information entered by the user, and adjust the enlarged area to be in a stationary state or a movable state.

In this embodiment of the present invention, the second gesture information is entered by the user and is used to adjust the enlarged area to be in the stationary state or the movable state. Data within the enlarged area in the stationary state or the movable state is in a non-editable state.

S104: Obtain an operation performed by the user on the enlarged area in the stationary state or the movable state, and adjust the enlarged area in the stationary state or the movable state according to the operation by the user on the enlarged area in the stationary state or the movable state.

In this embodiment of the present invention, the user may perform an operation on the enlarged area in the stationary state or the movable state. The terminal adjusts the enlarged area according to the operation performed by the user on the enlarged area, to make it convenient for the user to edit data content displayed within the enlarged area.

In this embodiment of the present invention, if the enlarged area is adjusted to be in the stationary state, that is, the enlarged area is non-movable, the user may edit, at a fixed position, the data content displayed within the enlarged area, improving operability of a data editing function within the enlarged area.

In this embodiment of the present invention, if the enlarged area is adjusted to be in the movable state, the user may adjust a position of the enlarged area in the movable state.

In this embodiment of the present invention, the operation performed on the enlarged area may be moving a cursor within the enlarged area, or may be moving the enlarged area by sliding a finger, or may be entering gesture information.

In this embodiment of the present invention, the adjustment performed on the enlarged area may be moving the enlarged area, to move the enlarged area to a position convenient for the user to perform editing. According to an actual case, in a process of moving the enlarged area, the data content displayed in an enlarged manner within the enlarged area may remain unchanged.

It should be noted that in this embodiment of the present invention, in the process of moving the enlarged area, the data content displayed in an enlarged manner within the enlarged area may also be changed, to make it convenient for the user to display data content at each position in an enlarged manner, and edit the data content displayed in an enlarged manner.

In this embodiment of the present invention, if the data content displayed in an enlarged manner within the enlarged area is changed, a second indication position that is on the screen of the terminal and that corresponds to the adjusted enlarged area can be determined. Data displayed in an enlarged manner is edited within the adjusted enlarged area, and the data displayed in an enlarged manner is data indicated by the second indication position.

In this embodiment of the present invention, the data content displayed in an enlarged manner within the adjusted enlarged area is the data indicated by the second indication position corresponding to the enlarged area. Therefore, as an enlarged area is moved, data content displayed in an enlarged manner within the enlarged area is also changed into data content indicated by a position of the adjusted enlarged area, so that the user edits the data content more easily and conveniently.

S105: Obtain third gesture information entered by the user, activate, according to the third gesture information, data displayed in an enlarged manner within the adjusted enlarged area to an editable state, and edit the data displayed in an enlarged manner within the adjusted enlarged area.

The enlarged area is in the stationary state or the movable state, and the data within the enlarged area is in the non-editable state. Before editing, within the adjusted enlarged area, the data displayed in an enlarged manner, the user may enter the third gesture information, and activate the data within the enlarged area to the editable state according to the third gesture information. The third gesture information includes, but is not limited to: finger joint information, pressing information, and double-tap information.

According to the data editing method provided in this embodiment of the present invention, an enlarged area is pre-created according to an indication position indicated by first gesture information entered by a user. Then, the created enlarged area is adjusted, according to second gesture information entered by the user, to be in a stationary state or a movable state, and is further adjusted. Then, data displayed in an enlarged manner within the adjusted enlarged area is edited. In this way, the user can conveniently and accurately adjust a position of a cursor when performing editing, and the user can adjust a position of the enlarged area, improving operation flexibility of a data editing function.

The data editing method shown in FIG. 1 is described in detail below in this embodiment of the present invention with reference to an actual application.

In this embodiment of the present invention, the first gesture information entered by the user may be finger joint information, pressure pressing information, double-tap information, or the like. Specific gesture information is not limited in this embodiment of the present invention, and pressure pressing is used below as an example for description.

Figure 3:
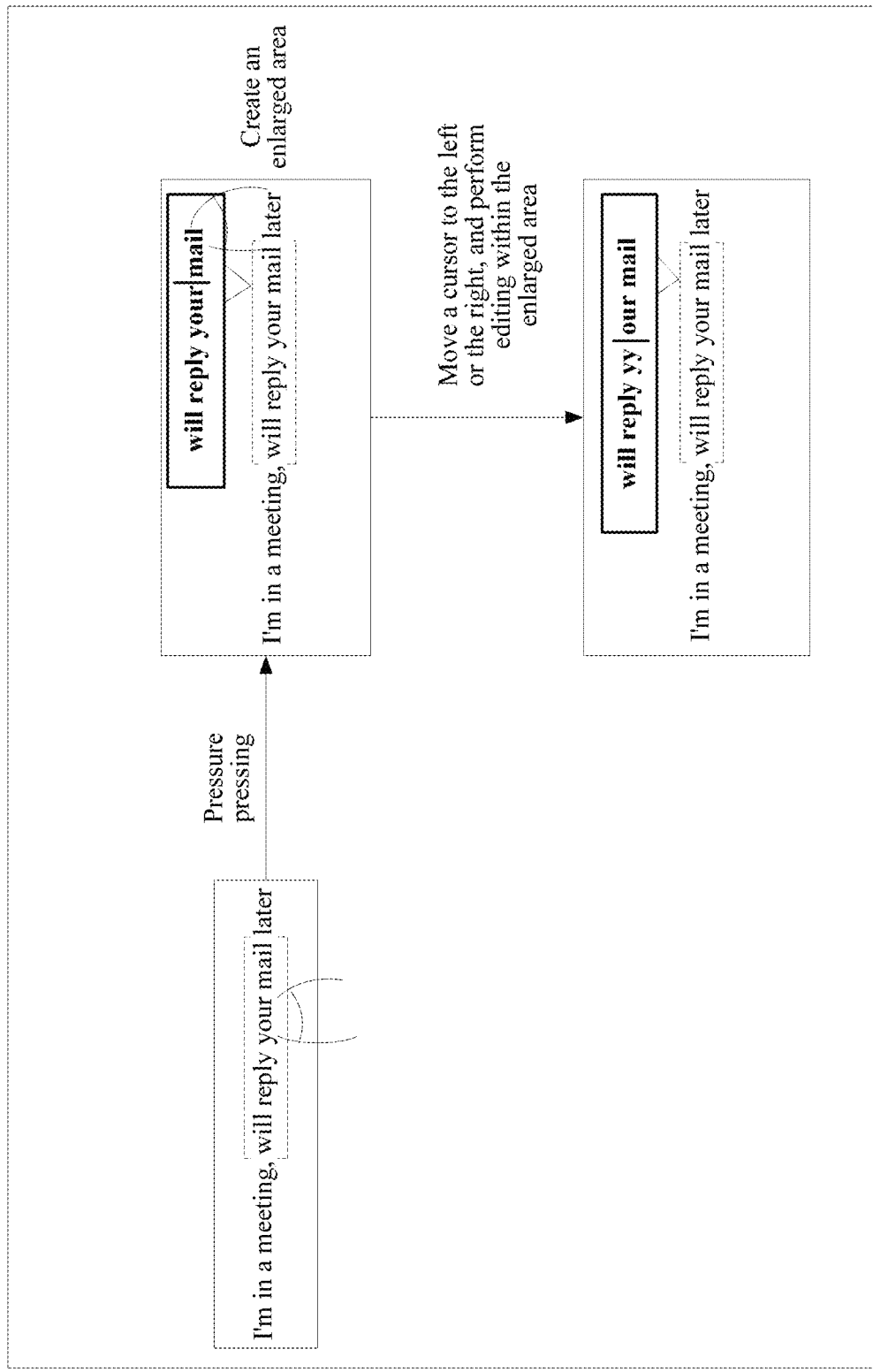
FIG. 3 is a schematic diagram of an implementation process of a data editing method according to an embodiment of the present invention.

In this embodiment of the present invention, the screen of the terminal may be a touchscreen, and the user may directly perform pressure pressing on the screen of the terminal by using a finger. The terminal detects that the first gesture information entered by the user is pressure pressing, and determines a position of the pressure pressing. As shown in FIG. 3, the position of the pressure pressing is between characters "your" and "mail", so that according to the position of the pressing and by using the position of the pressing as a center, characters "will", "reply", "your" and "mail" may be selected as data content to be displayed in an enlarged manner. After determining the data content to be displayed in an enlarged manner, the terminal invokes an enlargement tool control, and displays the characters "will", "reply", "your" and "mail" in an enlarged manner. That is, an enlarged area is created according to the position indicated by the pressing gesture input by the user. An area framed within a dash-line box in the figure is the enlarged area needing to be created.

In this embodiment of the present invention, as shown in FIG. 3, after the enlarged area is created, the finger moves to the enlarged area, and the data content is edited within the created enlarged area. In this embodiment of the present invention, a cursor may be moved within the enlarged area. As shown in FIG. 3, the cursor may be moved to the left or the right, and text editing is performed.

Figure 4:
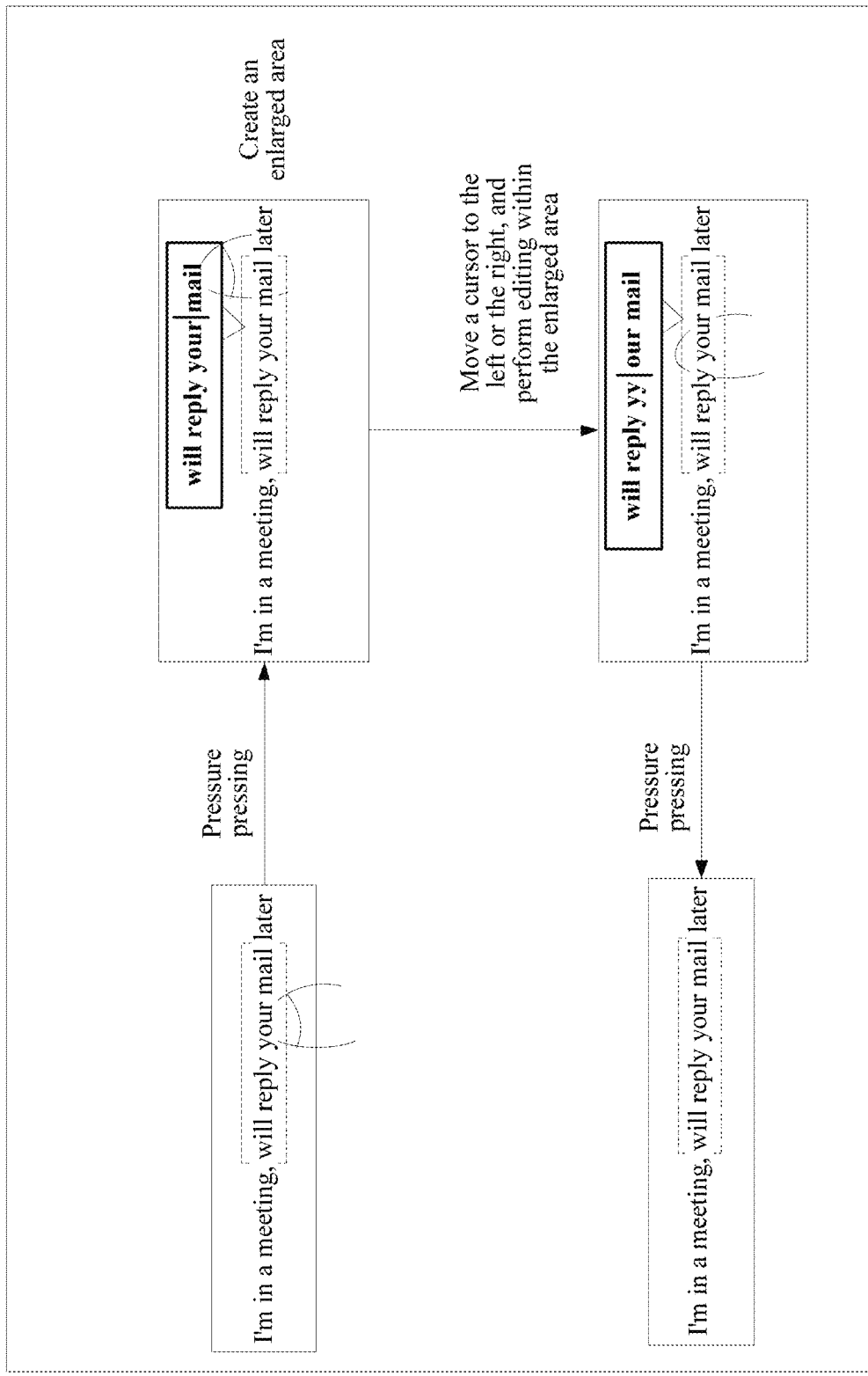
FIG. 4 is a schematic diagram of an implementation process of removing an enlarged area according to an embodiment of the present invention.

Optionally, in this embodiment of the present invention, after the enlarged area is created, the enlarged area may be removed by entering gesture information by the user. As shown in FIG. 4, the user may further perform pressure pressing on the screen of the terminal, to remove the enlarged area.

In this embodiment of the present invention, after creating the enlarged area according to the indication position indicated by the first gesture information entered by the user, the user may adjust the enlarged area. That is, the enlarged area may be adjusted according to an input operation performed by the user on the enlarged area.

In this embodiment of the present invention, the adjustment of the enlarged area may have the following cases.

A first case:

If the operation performed by the user on the enlarged area is moving the cursor within the enlarged area, a position of the moved cursor within the enlarged area is detected, and the enlarged area is adjusted according to the position to which the cursor is moved.

In this embodiment of the present invention, if the cursor is moved to a leftmost edge of the enlarged area, the enlarged area is moved to the left by N characters by using the cursor as a start position, where N is a positive integer; or if the cursor is moved to a rightmost edge of the enlarged area, the enlarged area is moved to the right by N characters by using the cursor as a start position, where N is a positive integer.

Figure 5:
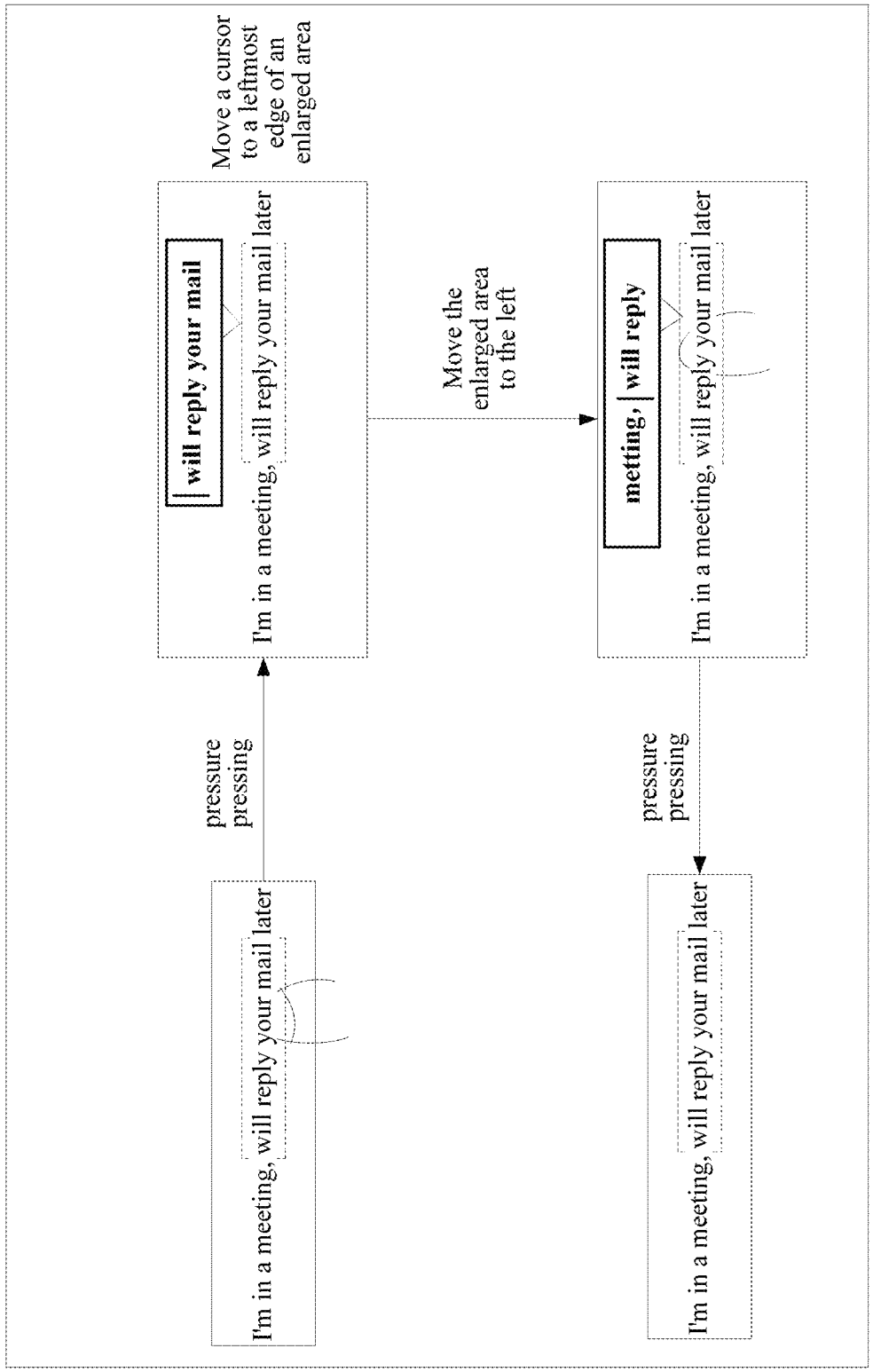
FIG. 5 is a first schematic diagram of adjusting an enlarged area according to an embodiment of the present invention.

FIG. 5 is a schematic diagram of adjusting the enlarged area according to movement of the cursor within the enlarged area. After the cursor is moved to the leftmost edge of the enlarged area, the enlarged area is moved to the left by eight characters, and data content at a second indication position corresponding to the adjusted enlarged area is displayed in an enlarged manner within the adjusted enlarged area, to implement that as the cursor moves, the enlarged area automatically extends to display the data content in an enlarged manner. FIG. 5 describes an example in which the cursor is moved to the left in a row direction in which data is displayed. An implementation process in which the cursor is moved to the right is similar to this, and is not described in detail herein.

A second case:

If the operation performed by the user on the enlarged area is moving the enlarged area, the enlarged area may be adjusted in the following manner according to the operation performed by the user on the enlarged area:

if the operation performed by the user on the enlarged area is moving the enlarged area, determining a moving direction of the enlarged area; and moving the enlarged area step by step in the moving direction according to a stepping unit, where the stepping unit is a minimum unit determined according to the moving direction for moving the enlarged area.

In this embodiment of the present invention, according to the direction in which the user moves the enlarged area, different manners may be used to move the enlarged area step by step in the moving direction according to the stepping unit.

A: If the moving direction in which the user moves the enlarged area is a horizontal direction, and the horizontal direction involved in this embodiment of the present invention is the row direction in which data is displayed, the enlarged area is moved, by using a center of the enlarged area as an origin and by using at least one character string as the stepping unit, step by step in the row direction in which data is displayed, as shown in FIG. 6.

Figure 6:
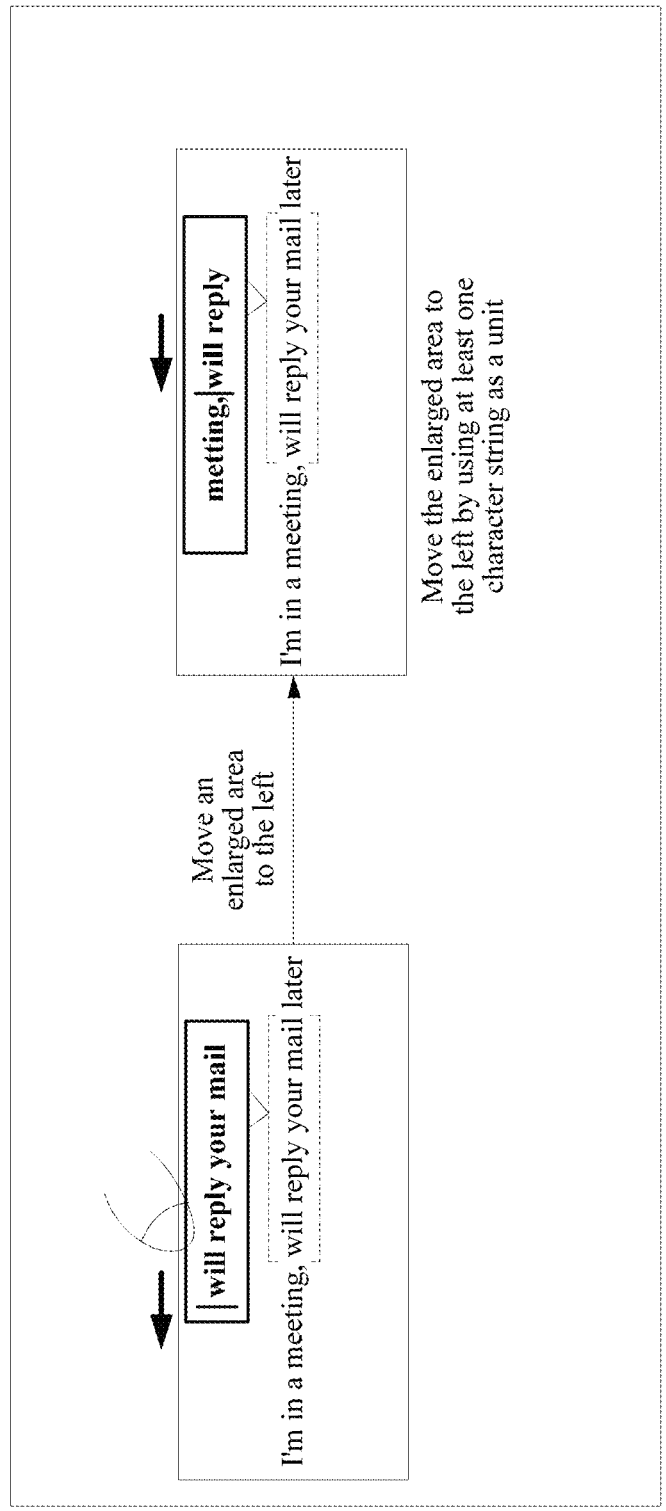
FIG. 6 is a second schematic diagram of adjusting an enlarged area according to an embodiment of the present invention.

FIG. 6 describes an example in which the user slides a finger to the left in the horizontal direction, that is, the enlarged area is moved to the left. An implementation process in which the enlarged area is moved to the right is similar to this, and is not described in detail herein.

In this embodiment of the present invention, by using at least one character string as the stepping unit, the enlarged area is moved step by step in the row direction in which data is displayed, so that the data content indicated by the second indication position corresponding to the enlarged area whose position has been adjusted is complete data. In this embodiment of the present invention, the character string may be a one-byte English character, and a two-byte Chinese character.

Optionally, in this embodiment of the present invention, a moving speed of moving the enlarged area by the user may be controlled by a speed at which the finger of the user is slid within the enlarged area. If the finger is slid to the leftmost edge or the rightmost edge of the enlarged area, and stays for a period of time, where the period of time may be preset, it indicates that the enlarged area is kept being moved to the left or the right. In this case, the enlarged area may be moved step by step by using at least one character string as the stepping unit, until the enlarged area is moved to the leftmost edge or the rightmost edge of the screen of the terminal.

B: If the moving direction in which the user moves the enlarged area is a vertical direction, and the vertical direction is a column direction in which data is displayed, by using a center of the enlarged area as an origin and by using at least one integer row as the stepping unit, the enlarged area is moved step by step in the column direction in which data is displayed, as shown in FIG. 7.

Figure 7:
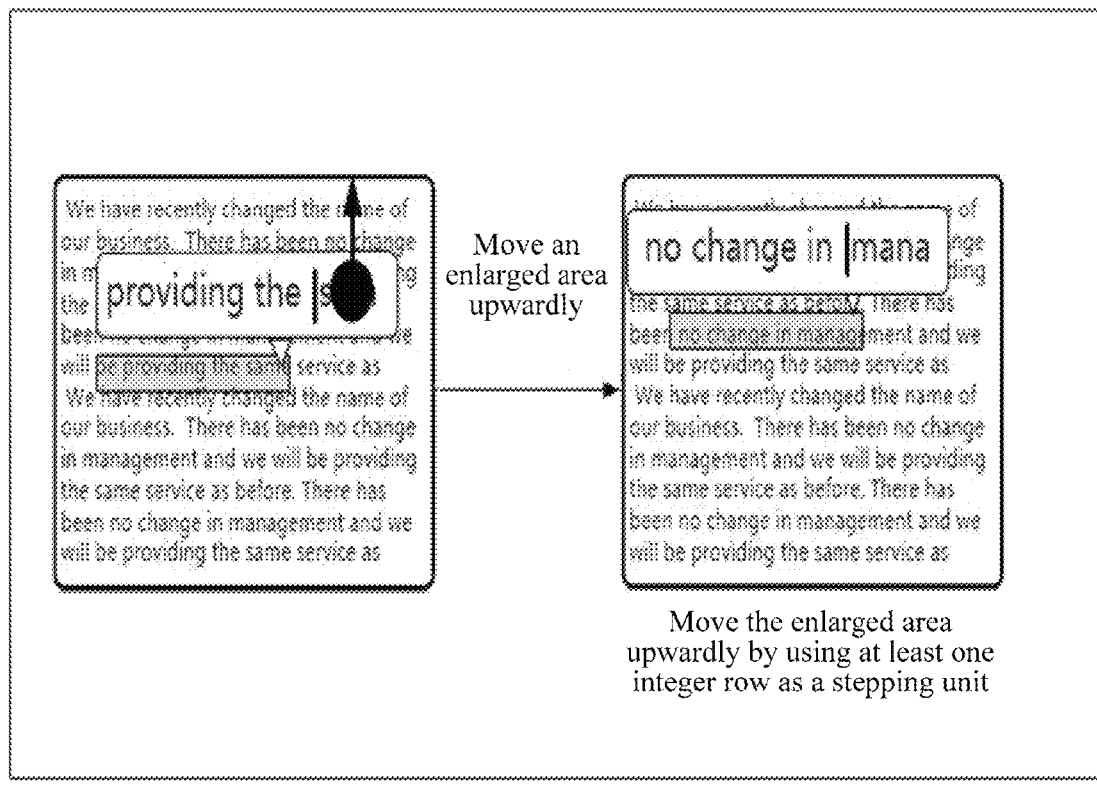
FIG. 7 is a third schematic diagram of adjusting an enlarged area according to an embodiment of the present invention.

FIG. 7 describes an example in which the user slides a finger upwardly in the vertical direction, that is, the enlarged area is moved upwardly. An implementation process in which the enlarged area is moved downwardly is similar to this, and is not described in detail herein.

In this embodiment of the present invention, by using at least one integer row as the stepping unit, the enlarged area is moved step by step in the column direction in which data is displayed, so that there is a vertical correspondence in the vertical direction between data content displayed in an enlarged manner within the enlarged area whose position has been adjusted and data content displayed within the enlarged area whose position is not adjusted. For example, there are M characters in the enlarged area that is not adjusted. After the enlarged area is moved upwardly by one row, M straight upward characters are displayed within the enlarged area.

Optionally, in this embodiment of the present invention, the moving speed of moving the enlarged area by the user may be controlled by a speed at which the finger of the user is slid within the enlarged area. If the finger is slid to a bottom edge or a top edge of the enlarged area, and stays for a period of time, where the period of time may be preset, it indicates that the enlarged area is kept being moved downwardly or upwardly. In this case, the enlarged area may be moved step by step by using at least one integer row as the stepping unit, until the enlarged area is moved to the bottom edge or the top edge of the screen of the terminal.

Figure 8:
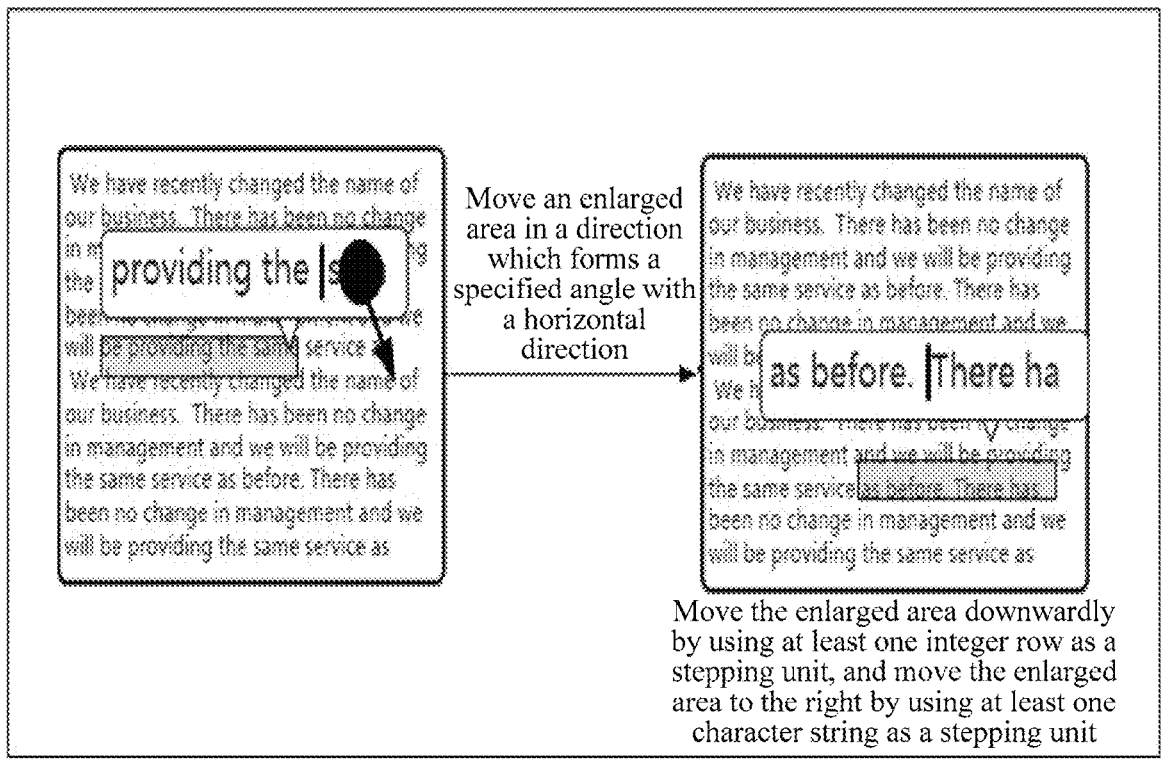
FIG. 8 is a fourth schematic diagram of adjusting an enlarged area according to an embodiment of the present invention.

C: If the moving direction in which the user moves the enlarged area is an angular direction which forms a specified angle with the row direction in which data is displayed, by using a center of the enlarged area as an origin, the enlarged area is moved step by step by using at least one integer row as the stepping unit, in a column direction in which data is displayed and that corresponds to the angular direction, and the enlarged area is moved by using at least one integer row as the stepping unit, in a row direction in which data is displayed and that corresponds to the angular direction, as shown in FIG. 8.

In this embodiment of the present invention, the enlarged area is moved step by step by using at least one integer row as the stepping unit, in the column direction in which data is displayed and that corresponds to the angular direction, and is moved by using at least one integer row as the stepping unit, in the row direction in which data is displayed and that corresponds to the angular direction, so that there is a correspondence between the data content displayed in an enlarged manner in the enlarged area whose position has been adjusted and the data content displayed within the enlarged area whose position is not adjusted. For example: there are M characters in the enlarged area that is not adjusted. After the enlarged area is moved downwardly in a forward direction of the angle by one row and an integer number of character strings are moved to the right, M characters that are in the forward direction of the angle are displayed within the enlarged area Optionally, in this embodiment of the present invention, the moving speed of moving the enlarged area by the user may be controlled by a speed at which the finger of the user is slid within the enlarged area. If the finger stays for a period of time in a process of sliding in the angular direction, the period of time being preset, it indicates that the enlarged area is moved in the forward direction of the angular direction from time to time, until to an edge of the screen of the terminal.

A third case:

If the operation performed by the user on the enlarged area is entering second gesture information, the enlarged area is adjusted to be in a stationary state or a movable state. The second gesture information includes, but is not limited to: finger joint information, pressing information, and double-tap information.

In this embodiment of the present invention, the terminal may adjust, according to the second gesture information entered by the user, the enlarged area to be in the movable state. That is, the user may move the enlarged area, including: movement in a horizontal direction, in a vertical direction, or in an angular direction that forms an angle with the horizontal direction, as involved in the foregoing embodiments. The enlarged area is adjusted to a position convenient for an operation, and data content displayed within the enlarged area is edited.

In this embodiment of the present invention, the terminal may further adjust, according to the second gesture information entered by the user, the enlarged area to be in the stationary state, that is, the enlarged area is non-movable, so that the user can edit, at a fixed position, the data content displayed within the enlarged area, improving operability of a data editing function within the enlarged area.

It should be noted that in this embodiment of the present invention, to further improve the operability of editing the data content within the enlarged area by the user, the enlarged area is in the stationary state or the movable state, and the data within the enlarged area is in a non-editable state. Before editing, within the adjusted enlarged area, the data displayed in an enlarged manner, the user may enter third gesture information, and activate the data within the enlarged area to an editable state according to the third gesture information. The third gesture information includes, but is not limited to: finger joint information, pressing information, and double-tap information.

Figure 9:
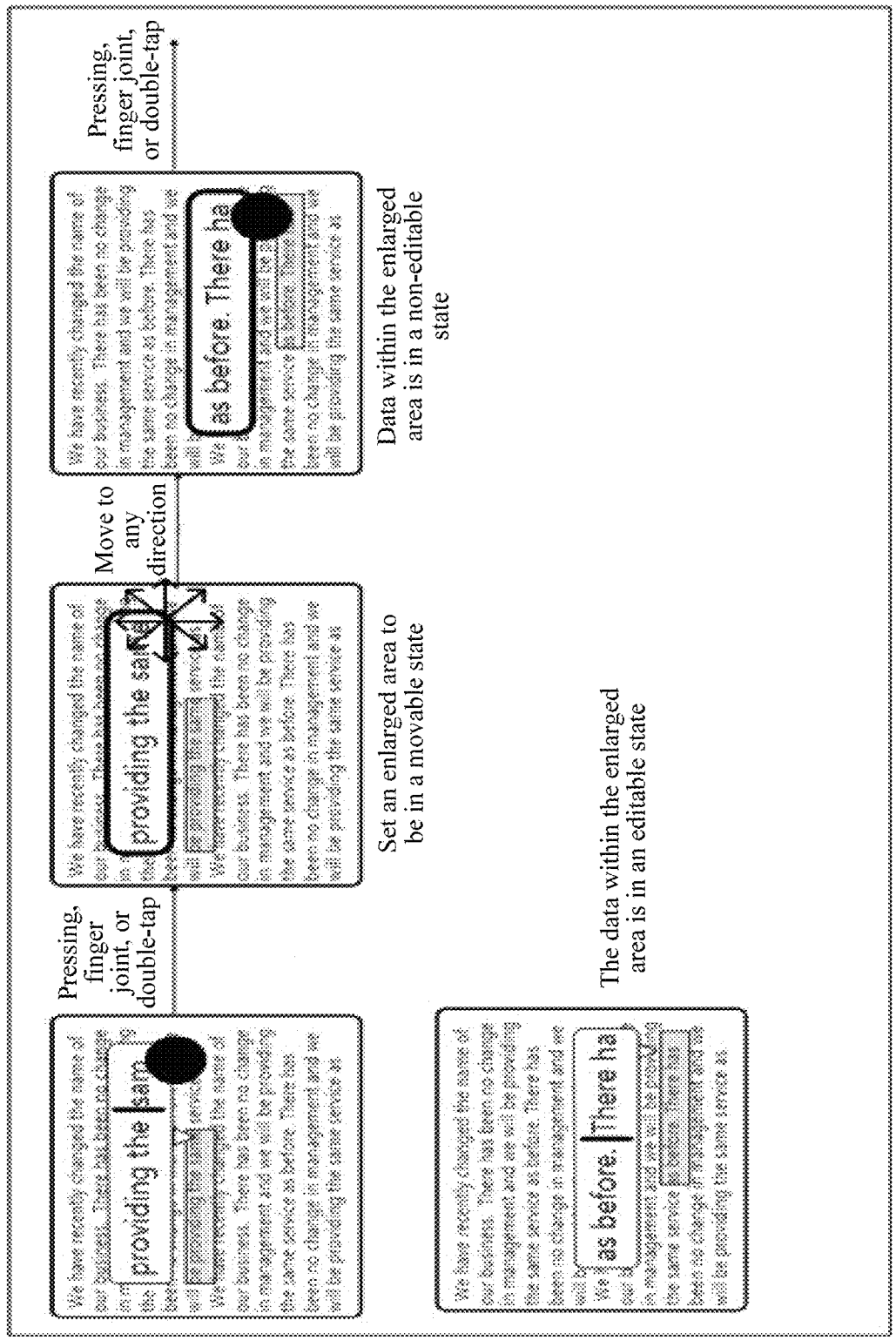
FIG. 9 is a schematic diagram of adjusting an enlarged area to be in a movable state according to an embodiment of the present invention.
Figure 10:
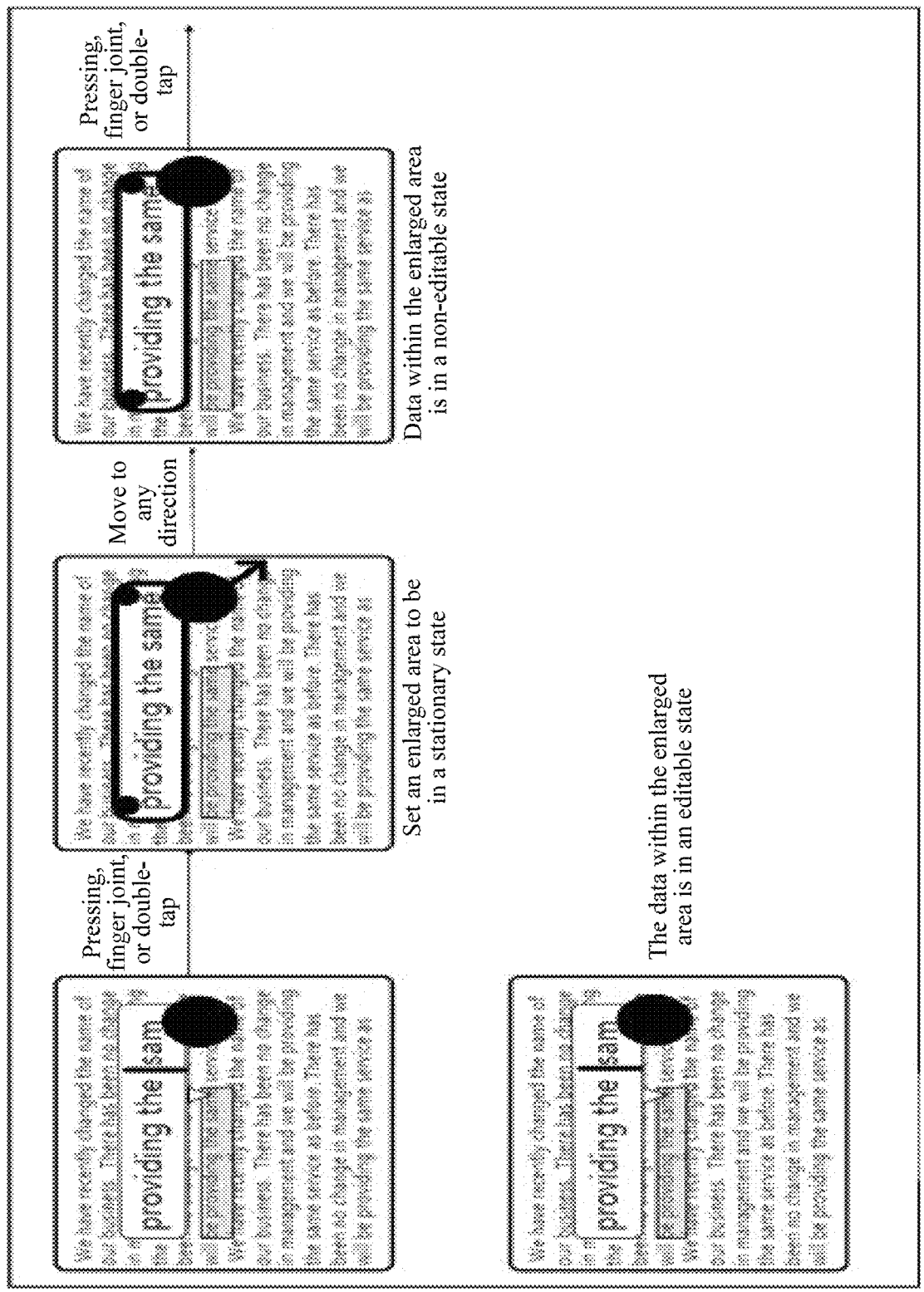
FIG. 10 is a schematic diagram of adjusting an enlarged area to be in a stationary state according to an embodiment of the present invention.

For a schematic diagram of adjusting an enlarged area to be in a stationary state or a movable state according to an embodiment of the present invention, refer to FIG. 9 and FIG. 10.

In FIG. 9, a user makes the enlarged area in the movable state by entering second gesture information such as pressure pressing information, finger joint information, or double-tap information. The enlarged area in the movable state may be moved in any direction according to an input operation by the user on the enlarged area. In a moving process, data in the enlarged area is in a non-editable state, but data content displayed in an enlarged manner within the enlarged area is changed as a position of the enlarged area changes. If the user further enters third gesture information such as pressing information, finger joint information, or double-tap information, the data within the enlarged area may be activated to an editable state, and the user edits the data content displayed in an enlarged manner within the enlarged area. After editing the data content displayed in an enlarged manner within the enlarged area, the user may enter fourth gesture information such as pressing information, finger joint information, or double-tap information, and remove the enlarged area according to the fourth gesture information.

In FIG. 10, a user makes, according to second gesture information such as pressure pressing information, finger joint information, or double-tap information, the enlarged area to be in the stationary state. The enlarged area in the stationary state cannot be moved, and the enlarged area in the stationary state is in a non-editable state. If the user further enters third gesture information such as pressing information, finger joint information, or double-tap information, data within the enlarged area may be activated to an editable state, and the user edits data content displayed in an enlarged manner within the enlarged area. After editing the data content displayed in an enlarged manner within the enlarged area, the user may enter fourth gesture information such as pressing information, finger joint information, or double-tap information, and remove the enlarged area according to the fourth gesture information.

Figure 11:
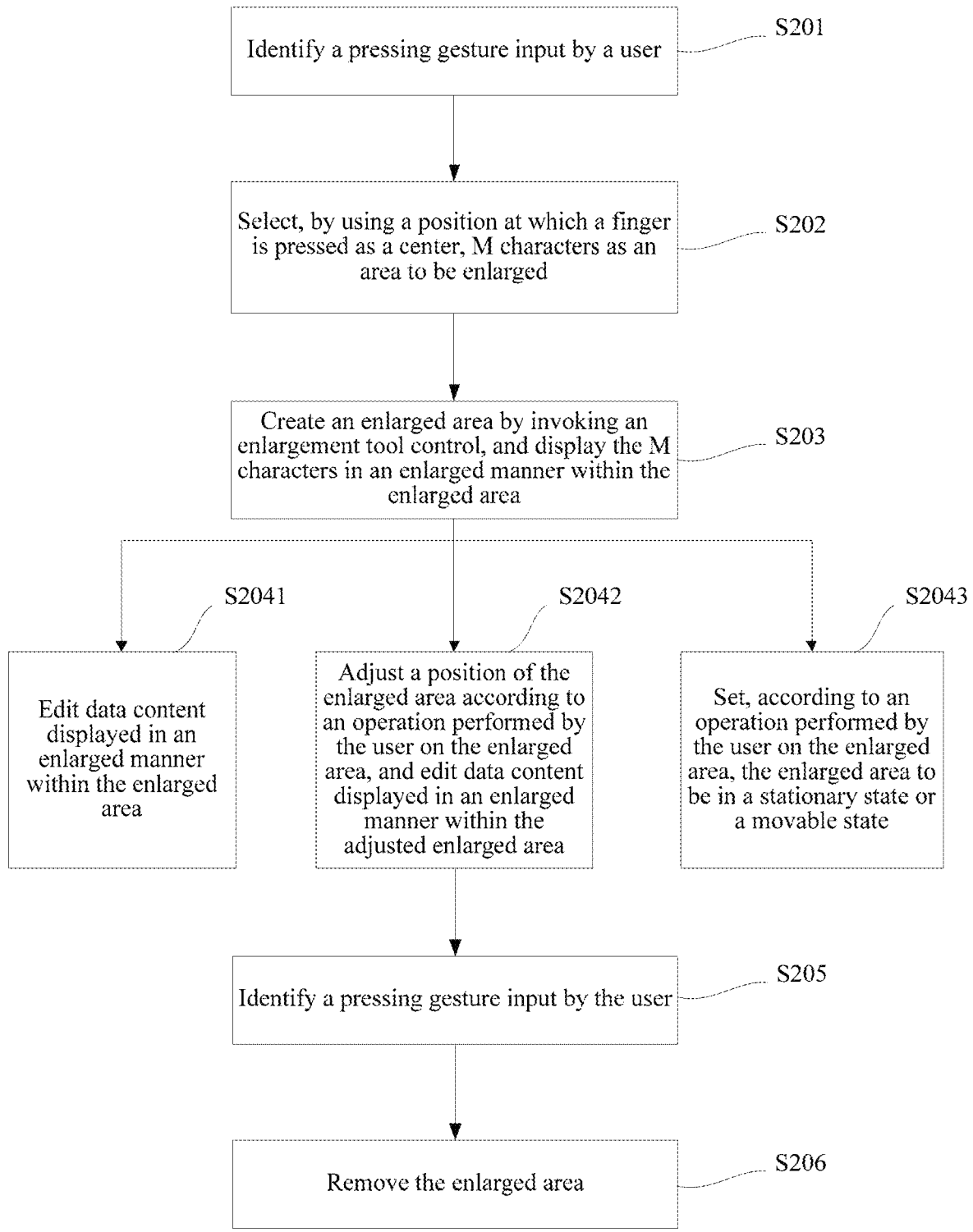
FIG. 11 is another flowchart of a data content editing method according to an embodiment of the present invention.

The data editing method involved in the foregoing embodiment is described according to an embodiment of the present invention by using an example in which gesture information entered by a user is pressure pressing. FIG. 11 is another flowchart of a data content editing method according to an embodiment of the present invention. As shown in FIG. 11, the method includes:

S201: Identify a pressing gesture input by a user.

S202: Select, by using a position at which a finger is pressed as a center, M characters as an area to be enlarged.

S203: Create an enlarged area by invoking an enlargement tool control, and display the M characters in an enlarged manner within the enlarged area.

S2041: Edit data content displayed in an enlarged manner within the enlarged area. Or:

S2042: Adjust a position of the enlarged area according to an operation performed by the user on the enlarged area, and edit data content displayed in an enlarged manner within the adjusted enlarged area. Or:

S2043: Set, according to an operation performed by the user on the enlarged area, the enlarged area to be in a stationary state or a movable state. When the enlarged area is set to be in the stationary state or in the movable state, if the user needs to edit data content displayed in an enlarged manner within the enlarged area, the user further needs to enter a gesture such as pressing, to activate the data within the enlarged area to an editable state, and then edit the data content displayed in an enlarged manner within the adjusted enlarged area.

S205: Identify a pressing gesture input by the user.

S206: Remove the enlarged area.

According to the data editing method provided in this embodiment of the present invention, an enlarged area is pre-created according to an indication position indicated by first gesture information entered by a user. Then, according to second gesture information entered by the user, the created enlarged area is moved, and set to be in a movable state or a stationary state. Data content at an indication position indicated by the second gesture information is displayed in an enlarged manner within the adjusted enlarged area, and data displayed in an enlarged manner is edited. In this way, the user can conveniently and accurately adjust a position of a cursor when performing editing, and the user can adjust a position of the enlarged area, further improving operation flexibility of a data editing function.

Figure 12:
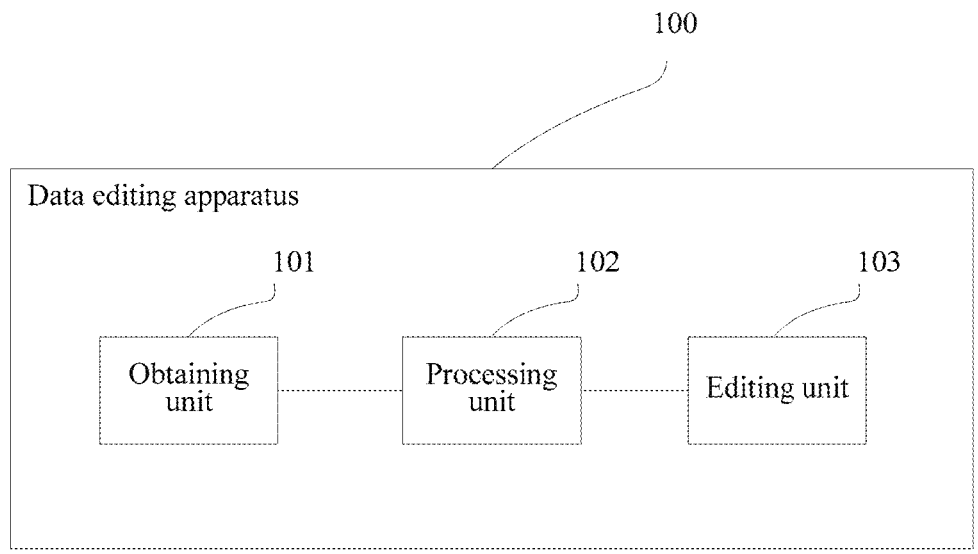
FIG. 12 is a schematic structural diagram of a data editing apparatus according to an embodiment of the present invention.

Based on the data editing method provided in the foregoing embodiments, an embodiment of the present invention provides a data editing apparatus 100. As shown in FIG. 12, the data editing apparatus 100 includes an obtaining unit 101, a processing unit 102, and an editing unit 103.

The obtaining unit 101 is configured to obtain first gesture information, second gesture information, and third gesture information entered by a user, and is configured to obtain an operation performed by the user on an enlarged area in a stationary state or a movable state, where the first gesture information is used to create the enlarged area, the second gesture information is used to adjust the enlarged area to be in the stationary state or the movable state, and the third gesture information is used to activate data displayed in an enlarged manner within the adjusted enlarged area to an editable state;

The processing unit 102 is configured to create the enlarged area according to an indication position on a screen of a terminal by the first gesture information obtained by the obtaining unit 101.

The processing unit 102 is further configured to adjust, according to the second gesture information obtained by the obtaining unit 101, the enlarged area to be in the stationary state or the movable state, where data within the enlarged area in the stationary state or the movable state is in a non-editable state.

The processing unit 102 is further configured to adjust the enlarged area in the stationary state or the movable state according to the operation that is performed by the user on the enlarged area in the stationary state or the movable state and that is obtained by the obtaining unit 101, where if the enlarged area is in the stationary state, the enlarged area is adjusted to a fixed position on the screen of the terminal, or if the enlarged area is in the movable state, a position of the enlarged area in the movable state is adjusted according to the operation performed by the user on the enlarged area in the movable state.

The editing unit 103 is configured to activate the data displayed in an enlarged manner within the adjusted enlarged area to the editable state according to the third gesture information entered by the user and obtained by the obtaining unit 101, and edit the data displayed in an enlarged manner within the adjusted enlarged area.

Specifically, the processing unit 102 is specifically configured to create, in the following manner, the enlarged area according to the indication position on the screen of the terminal by the first gesture information:

selecting, in a row direction in which data is displayed and by using the indication position on the screen of the terminal by the first gesture information as a center, M characters as characters to be enlarged, where M is a positive integer; and creating, by using an enlargement tool control, an enlarged area in which the M characters can be displayed.

Specifically, the processing unit 102 is specifically configured to adjust, in the following manner, a position of the enlarged area in the movable state according to the operation performed by the user on the enlarged area in the movable state:

if the operation performed by the user on the enlarged area in the movable state is moving a cursor within the enlarged area in the movable state, detecting a position of the moved cursor within the enlarged area in the movable state; and if the cursor is moved to a leftmost edge of the enlarged area in the movable state, moving the enlarged area in the movable state to the left by N characters by using the cursor as a start position, where N is a positive integer; or if the cursor is moved to a rightmost edge of the enlarged area in the movable state, moving the enlarged area in the movable state to the right by N characters by using the cursor as a start position, where N is a positive integer.

Specifically, the processing unit 102 is specifically configured to adjust, in the following manner, a position of the enlarged area in the movable state according to the operation performed by the user on the enlarged area in the movable state:

if the operation performed by the user on the enlarged area in the movable state is moving the enlarged area, determining a moving direction; and moving the enlarged area in the movable state step by step in the moving direction according to a stepping unit, where the stepping unit is a minimum unit determined according to the moving direction for moving the enlarged area.

Specifically, the processing unit 102 is specifically configured to move, in the following manner, the enlarged area in the movable state step by step in the moving direction according to the stepping unit:

if the moving direction is the row direction in which data is displayed, moving, by using a center of the enlarged area in the movable state as an origin and by using at least one character string as the stepping unit, the enlarged area step by step in the row direction in which data is displayed;

if the moving direction is a column direction in which data is displayed, moving, by using a center of the enlarged area as an origin and by using at least one integer row as the stepping unit, the enlarged area step by step in the column direction in which data is displayed; or if the moving direction is an angular direction which forms a specified angle with the row direction in which data is displayed, by using a center of the enlarged area as an origin, moving, by using at least one integer row as the stepping unit, the enlarged area step by step in a column direction in which data is displayed and that corresponds to the angular direction, and moving, by using one character string as the stepping unit, the enlarged area in a row direction in which data is displayed and that corresponds to the angular direction.

In this embodiment of the present invention, the first gesture information, the second gesture information and the third gesture information that are obtained by the obtaining unit 101 each include finger joint information, pressing information, or double-tap information.

In a feasible implementation manner in this embodiment of the present invention, the obtaining unit 101 is further configured to obtain fourth gesture information entered by the user; and the processing unit 102 is further configured to remove the enlarged area according to the fourth gesture information obtained by the obtaining unit 101.

According to the data editing apparatus 100 provided in this embodiment of the present invention, an enlarged area is pre-created according to an indication position indicated by first gesture information entered by a user. Then, the created enlarged area is adjusted, according to second gesture information entered by the user, to be in a stationary state or a movable state, and is further adjusted. Then, data displayed in an enlarged manner is edited within the adjusted enlarged area. In this way, the user can conveniently and accurately adjust a position of a cursor when performing editing, and the user can adjust a position of the enlarged area, improving operation flexibility of a data editing function.

In a specific implementation process of this embodiment of the present invention, a person skilled in the art may understand that the data editing apparatus 100 involved in this embodiment of the present invention may be a handheld device, an in-vehicle device, a wearable device, a computing device, and various user equipment (User Equipment, UE), mobile stations (Mobile station, MS) terminals (terminal), terminal devices (Terminal Equipment), and the like.

Figure 13:
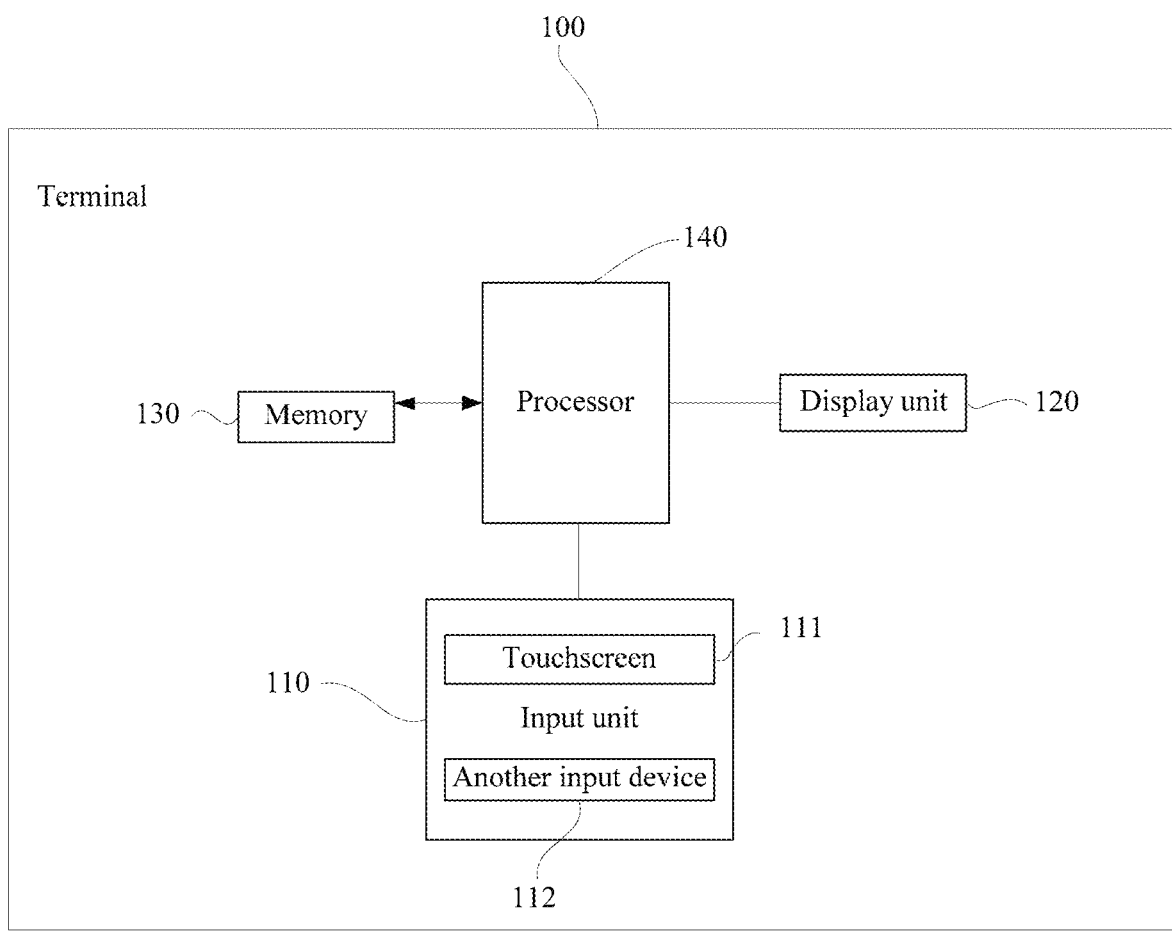
FIG. 13 is a schematic structural diagram of a terminal for editing data according to an embodiment of the present invention.

An embodiment of the present invention is described below by using an example in which the data editing apparatus 100 is a terminal 100. FIG. 13 shows a structural block diagram of the terminal 100. The terminal 100 may include an input unit 110, a display unit 120, a memory 130, a processor 140, and other components.

A person skilled in the art should understand that FIG. 12 is merely an example of the terminal 100, and does not constitute a limitation to the terminal 100, and the terminal 100 may include more or fewer components than those shown in the figure, or some components may be combined, or different components may be used.

The input unit 110 may be configured to receive entered figure or character information, and generate key signal input related to a user setting and function control of the portable multi-function apparatus. Specifically, the input unit 110 may include a touchscreen 111 and another input device 112. The touchscreen 111 may collect a touch operation of a user on or near the touchscreen 111 (such as an operation of the user on or near the touchscreen by using any suitable object such as a finger, a joint, or a touch pen), and drive a corresponding connection apparatus according to a preset program. The touchscreen may detect a touch action of the user on the touchscreen, convert the touch action into a touch signal and send the touch signal to the processor 140. The touchscreen can receive and execute a command sent from the processor 140. The touch signal includes at least information about touch point coordinates. The touchscreen 111 may provide an input interface and an output interface between the terminal 100 and the user. In addition, the touchscreen may be a resistive, capacitive, infrared, and surface acoustic wave type touchscreen. In addition to the touchscreen 111, the input unit 110 may further include the another input device. Specifically, the another input device 112 may include, but is not limited to: one or more of a physical keyboard, a functional key (such as a volume control key or a switch key), a trackball, a mouse, and a joystick.

The display unit 120 may be configured to display data content, information entered by the user, information provided to the user, or various menus of the terminal 100. Further, the touchscreen 111 may cover a display panel. After detecting a touch operation on or near the touchscreen 111, the touchscreen 111 transfers the touch operation to the processor 140, to determine a type of the touch event. Then, the processor 140 provides corresponding visual output on the display panel according to the type of the touch event. In this embodiment, the touchscreen and the display unit may be integrated into one component to implement an input function, an output function, and a display function of the terminal 100. For ease of description, in this embodiment of the present invention, the touchscreen combines functions of the touchscreen and the display unit. In some embodiments, the touchscreen and the display unit may be used as two separate components.

The memory 130 may be configured to store an instruction and data. The memory 130 may mainly include an instruction storage area and a data storage area. The data storage area can store an association relationship between a joint touch gesture and an application program function. The instruction storage area can store an operating system, an instruction required by at least one function, and the like. The instruction enables the processor 140 to execute the data editing method involved in the foregoing embodiment of the present invention.

The processor 140 is a control center of the terminal 100, and is connected to various parts of a mobile phone by using various interfaces and lines. The processor 140 performs various functions and data processing of the terminal 100 by running or executing the instruction stored in the memory 130 and invoking the data stored in the memory 130, thereby implementing overall monitoring on the mobile phone. Optionally, the processor 140 may include one or more processing units. Preferably, the processor 140 may be integrated with an application processor and a modem processor. The application processor mainly processes an operating system, a user interface, an application program, and the like. The modem processor mainly processes wireless communication. It may be understood that the foregoing modem processor may not be integrated into the processor 140. In some embodiments, the processor and the memory may be implemented on a single chip. In other embodiments, the processor and the memory may be implemented on separate chips.

Although not shown, the terminal 100 may further include a power source, an external interface, a radio frequency unit, an audio circuit, a speaker, a camera, a flash, and the like, which is not described in detail herein.

The foregoing descriptions are merely specific examples of the implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data editing method, comprising:
    obtaining first gesture information from a user at a terminal, wherein the first gesture information is pre-associated with creating an enlarged area on a screen of the terminal;
    outputting display of the enlarged area on the screen according to an indication position indicated on the screen, the outputting comprising creating the enlarged area on the screen in accordance with and in response to the obtaining the first gesture information, and displaying data captured within the enlarged area in an enlarged manner in a non-editable state;

obtaining second gesture information at the terminal from the user, wherein the second gesture information is pre-associated with selecting whether the enlarged area is to be in a stationary state or a movable state;

obtaining third gesture information at the terminal from the user, wherein:

responsive to the second gesture information indicating the enlarged area is to be in the movable state, the data displayed within the enlarged area is set to the non-editable state, and the third gesture information is pre-associated with performing a first operation associated with adjusting a position of the enlarged area on the screen, while maintaining the data displayed within the enlarged area in the enlarged manner in the non-editable state; and responsive to the second gesture information indicates the enlarged area is to be in the stationary state, the data displayed within the enlarged area is set to an editable state, and the third gesture information is pre-associated with performing a second operation associated with editing the data displayed within the enlarged area in the enlarged manner, while maintaining a fixed position of the enlarged area on the screen.

2. The method according to claim 1, wherein the creating the enlarged area according to an indication position indicated on a screen of a terminal by the first gesture information comprises:

selecting, in a row direction in which data is displayed and by using the indication position indicated on the screen of the terminal by the first gesture information as a center, M characters as characters to be enlarged, wherein M is a positive integer; and creating, by invoking an enlargement tool control, an enlarged area in which the M characters can be displayed.

3. The method according to claim 1, wherein,
if the first operation indicates moving a cursor within the enlarged area in the movable state, the method further comprises:
detecting a position of the moved cursor within the enlarged area in the movable state;
if the detecting indicates that the cursor is moved to a leftmost edge of the enlarged area in the movable state, moving the enlarged area in the movable state to the left by N characters by using the cursor as a start position, wherein N is a positive integer; and
if the detecting indicates that the cursor is moved to a rightmost edge of the enlarged area in the movable state, moving the enlarged area in the movable state to the right by N characters by using the cursor as a start position, wherein N is a positive integer.

4. The method according to claim 1, wherein:
if the first operation indicates moving the enlarged area, the method further comprises:
determining a moving direction; and
moving the enlarged area in the movable state step by step in the moving direction according to a stepping unit, wherein the stepping unit is a minimum unit determined according to the moving direction for moving the enlarged area.

5. The method according to claim 4, wherein the moving the enlarged area in the movable state step by step in the moving direction according to a stepping unit comprises:

if the moving direction is the row direction in which data is displayed, moving, by using a center of the enlarged area in the movable state as an origin and by using at least one character string as the stepping unit, the enlarged area step by step in the row direction in which data is displayed;

if the moving direction is a column direction in which data is displayed, moving, by using a center of the enlarged area as an origin and by using at least one integer row as the stepping unit, the enlarged area step by step in the column direction in which data is displayed; and if the moving direction is an angular direction which forms a specified angle with the row direction in which data is displayed, by using a center of the enlarged area as an origin, moving, by using at least one integer row as the stepping unit, the enlarged area step by step in a column direction in which data is displayed and that corresponds to the angular direction, and moving, by using one character string as the stepping unit, the enlarged area in a row direction in which data is displayed and that corresponds to the angular direction.

6. The method according to claim 1, wherein the first gesture information, the second gesture information and the third gesture information each comprises finger joint information, pressing information, or double-tap information.

7. The method according to claim 1, further comprising:
obtaining fourth gesture information entered by the user; and
removing the enlarged area according to the fourth gesture information.

8. A data editing apparatus, comprising:
a memory comprising instructions; and
a processor coupled to the memory,
wherein the instructions cause the processor to be configured to:
obtain first gesture information and second gesture information at a terminal from a user, wherein the first gesture information is pre-associated with creating an enlarged area on a screen of the terminal, and the second gesture information pre-associated with whether the enlarged area is to be in a stationary state or a movable state;
output display of the enlarged area on the screen according to an indication position indicated on the screen, the outputting comprising creating the enlarged area according to and in response to obtaining the first gesture information, and displaying data captured within the enlarged area in an enlarged manner in a non-editable state;
obtain third gesture information at the terminal from the user, wherein:
responsive to the second gesture information indicating that the enlarged area is to be in the movable state, the data displayed within the enlarged area is set to the non-editable state, and the third gesture information is pre-associated with
performing a first operation to adjust a position of the enlarged area on the screen, while maintaining the data displayed in within the enlarged area in the enlarged manner in the non-editable state; and
responsive to the second gesture information indicates the enlarged area is to be in the stationary state, the data displayed within the enlarged area is set to an editable state, and the third gesture information is pre-associated with performing a second operation associated with editing the data displayed within the enlarged area in the enlarged manner, while maintaining a fixed position of the enlarged area on the screen.

9. The apparatus according to claim 8, wherein creating the enlarged area according to the indication position indicated on the screen of the terminal by the first gesture information comprises:
   selecting, in a row direction in which data is displayed and by using the indication position indicated on the screen of the terminal by the first gesture information as a center, M characters as characters to be enlarged, wherein M is a positive integer; and
   creating, by invoking an enlargement tool control, an enlarged area in which the M characters can be displayed.

10. The apparatus according to claim 8, wherein,
   if the first operation indicates moving a cursor within the enlarged area in the movable state, the processor is further configured to:
   detect a position of the moved cursor within the enlarged area in the movable state;
   if the detecting indicates that the cursor is moved to a leftmost edge of the enlarged area in the movable state, move the enlarged area in the movable state to the left by N characters by using the cursor as a start position, wherein N is a positive integer; and
   if the detecting indicates that the cursor is moved to a rightmost edge of the enlarged area in the movable state, move the enlarged area in the movable state to the right by N characters by using the cursor as a start position, wherein N is a positive integer.

11. The apparatus according to claim 8, wherein,
   if the first operation indicates moving the enlarged area, the processor is further configured to:
   determine a moving direction; and
   move the enlarged area in the movable state step by step in the moving direction according to a stepping unit, wherein the stepping unit is a minimum unit determined according to the moving direction for moving the enlarged area.

12. The apparatus according to claim 11, wherein moving the enlarged area in the movable state step by step in the moving direction according to the stepping unit comprises:
   if the moving direction is the row direction in which data is displayed, moving, by using a center of the enlarged area in the movable state as an origin and by using at least one character string as the stepping unit, the enlarged area step by step in the row direction in which data is displayed;
   if the moving direction is a column direction in which data is displayed, moving, by using a center of the enlarged area as an origin and by using at least one integer row as the stepping unit, the enlarged area step by step in the column direction in which data is displayed; and
   if the moving direction is an angular direction which forms a specified angle with the row direction in which data is displayed, by using a center of the enlarged area as an origin, moving, by using at least one integer row as the stepping unit, the enlarged area step by step in a column direction in which data is displayed and that corresponds to the angular direction, and moving, by using one character string as the stepping unit, the enlarged area in a row direction in which data is displayed and that corresponds to the angular direction.

13. The apparatus according to claim 8, wherein the first gesture information, the second gesture information and the third gesture information each comprise finger joint information, pressing information, or double-tap information.

14. The apparatus according to claim 8, wherein the instructions further cause the processor to be configured to obtain fourth gesture information entered by the user; and
   remove the enlarged area according to the fourth gesture information obtained by the obtaining unit.

15. The apparatus according to claim 8, wherein the data editing apparatus is a terminal.

\* \* \* \* \*